United States Patent
Robert et al.

(12) 
(10) Patent No.: US 6,254,944 B1
(45) Date of Patent: Jul. 3, 2001

(54) MULTILAYER STRUCTURE COMPRISING A BINDER AND A LAYER OF POLYKETONE

(75) Inventors: Patrice Robert, Beaumont le Roger; Christophe Le Roy, Evreux, both of (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 08/888,137

(22) Filed: Jul. 3, 1997

(30) Foreign Application Priority Data

Jul. 5, 1996 (FR) .................................................. 96 08418

(51) Int. Cl.$^7$ .............................. B28B 21/00; B32B 1/08; B32B 27/36

(52) U.S. Cl. ..................... 428/34.6; 428/34.7; 428/35.2; 428/35.7; 428/35.9; 428/36.9; 428/36.91; 428/412; 428/413; 428/414; 428/416; 428/418; 428/457; 428/461; 428/501; 428/515; 428/524

(58) Field of Search ................... 428/412, 414, 428/416, 461, 524, 501, 413, 418, 457, 515, 34.6, 34.7, 35.2, 35.7, 35.9, 36.9, 36.91, 525

(56) References Cited

U.S. PATENT DOCUMENTS

| | | | |
|---|---|---|---|
| 3,882,194 | * 5/1975 | Krebaum et al. | 525/285 |
| 4,288,477 | * 9/1981 | Bordini et al. | 428/35.2 |
| 4,410,595 | * 10/1983 | Matsumoto et al. | 428/412 |
| 4,419,408 | * 12/1983 | Schmukler et al. | 428/424.4 |
| 4,654,255 | 3/1987 | Kojima et al. | 442/149 |
| 4,737,548 | 4/1988 | Kojima et al. | 525/193 |
| 4,871,618 | * 10/1989 | Kinneberg et al. | 428/461 |
| 5,232,786 | 8/1993 | Waters et al. | 428/475.8 |
| 5,300,338 | 4/1994 | Byrd, Jr. et al. | 428/36.6 |
| 5,369,170 | 11/1994 | Weinkauf | 525/64 |
| 5,393,818 | 2/1995 | Masse et al. | 524/270 |
| 5,405,700 | * 4/1995 | Weinkauf et al. | 428/413 |
| 5,516,824 | 5/1996 | Masse et al. | 524/270 |
| 5,637,410 | * 6/1997 | Bonner et al. | 428/516 |
| 5,641,823 | 6/1997 | Masse et al. | 524/270 |

FOREIGN PATENT DOCUMENTS

| | | |
|---|---|---|
| 0 569 101 | 11/1993 | (EP) . |
| 597275 | 5/1994 | (EP) . |
| PCT/GB94/02114 | * 9/1994 | (EP) . |
| 171626 | 2/1996 | (EP) . |
| 2295724 | 10/1990 | (JP) . |
| 5-147178 | 6/1993 | (JP) . |
| 95/09212 | 4/1995 | (WO) . |

OTHER PUBLICATIONS

European Search Report dated Oct. 8, 1997.
Database WPI, Section CH, Week 9328, Derwent Publications, Ltd., London, GB, Class A17, AN 93–223935; Database WPI, Section CH, Week 9104, Derwent Publications Ltd., London, GB, AN 91–025936, 1997.
French Search Report Dated Dec. 20, 1996.

* cited by examiner

*Primary Examiner*—Leszek Kiliman
(74) *Attorney, Agent, or Firm*—Smith, Gambrell & Russell

(57) ABSTRACT

The invention relates to a multilayer structure comprising a layer of a binder either containing a hydroxyl function or containing an epoxy function or alternatively consisting of an ethylene/alkyl (meth)acrylate copolymer and, directly attached thereto, a layer of polyketone.

The structure may also comprise, on the binder side and directly attached thereto, either a layer of thermoplastic polymer such as polyethylene or a layer of rubber or a metal layer.

The invention is useful for manufacturing packaging, bottles or pipes.

28 Claims, No Drawings

MULTILAYER STRUCTURE COMPRISING A BINDER AND A LAYER OF POLYKETONE

FIELD OF THE INVENTION

The present invention relates to a multilayer structure comprising a layer of a binder and, directly attached thereto, a layer of polyketone. The binder is either a polymer containing hydroxyl functions or a polymer containing epoxy functions or a copolymer of ethylene and of an alkyl (meth)acrylate. The invention also relates to the above structure and, directly attached thereto on the binder side, a layer (F) of a thermoplastic polymer, such as polyethylene, of a rubber or alternatively a metal layer.

Thus, the invention provides a binder to bring about adhesion of a layer of polyketone and either a metal layer or a layer of a thermoplastic or of a rubber. The structures of the invention are useful for manufacturing flexible or rigid packages such as sachets or bottles, or for manufacturing pipes. These products may be manufactured by coextrusion, lamination or coextrusion blow-moulding. The polyketones are linear alternating copolymers of carbon oxide and of at least one unsaturated monomer.

BACKGROUND OF THE INVENTION

Application WO 95/09212 describes multilayers consisting of a layer of polyketone and a layer of polyolefin; the binder placed between these two layers is the reaction product of a polyolefin grafted with maleic anhydride and a diamine.

U.S. Pat. No. 5,369,170 describes a similar binder. The manufacture of the binders of the prior art may lead to crosslinking, which complicates their use, in particular the melt index (MFI) may be such that coextrusion can no longer be carried out.

DESCRIPTION OF THE INVENTION

The binder of the present invention is much simpler; it may be:
- either a thermoplastic polymer containing at least one hydroxyl function, which may be a polymer having a hydroxyl function, a mixture of polymers each having at least one hydroxyl function or a mixture of a polymer having at least one hydroxyl function with another polymer or any other combination.
- or a thermoplastic polymer containing at least one epoxy function, which may be a polymer having an epoxy function, a mixture of polymers each having at least one epoxy function or a mixture of a polymer having at least one epoxy function with another polymer or any other combination.
- or a thermoplastic polymer comprising ethylene units and at least one alkyl (meth)acrylate unit.

As regards the binder containing a hydroxyl function, the hydroxyl function is integrated into the polymer either by polymerization or by grafting of one or more appropriate monomers, or by chemical modification of an appropriate function which is already present in the polymer, or by reaction of the polymer which has been functionalized or of a functionalized polymer with a product providing at least one hydroxyl function.

The various reactions (polymerization, grafting or modification) are carried out according to the rules of the art in the solid or molten state or in solution.

The hydroxyl function is generally provided either by functional acrylic monomers such as, for example, HEA or HEMA (hydroxyethyl acrylate or methacrylate), or by alcohols bearing a polymerizable or graftable function (for example vinyl) such as, for example, vinylphenol. These monomers may also bear other functionalities that are sparingly reactive or unreactive with hydroxyl functions, such as an amide or an amine.

The hydroxyl function may also be obtained from an appropriate function which is already present in the polymer, by means of a suitable reaction, such as, for example, the catalysed hydrolysis of a vinyl alkylate function.

Other monomers may also be present in the polymer, such as one or more olefins (ethylene, propylene, butene, hexene, octene, 4-methylpentene, vinylnorbornene, etc.), an alkyl acrylate or methacrylate or a vinyl alkyl. These monomers may be present together.

The products obtained may be used alone or as a mixture with polymers which themselves may or may not contain hydroxyl functions. The use of an additive or of another polymer may be necessary in the case of mixtures in order to ensure good mixing and good compatibilization of the polymers.

It is also possible to start with a polymer bearing a carboxylic acid or carboxylic acid anhydride function, this function having been provided, for example by copolymerization or by grafting, to neutralize this function with a diol such as ethylene glycol or with a polyether diol such as polyethylene glycol, polypropylene glycol or polytetramethylene glycol.

Advantageously, the polymers on which the hydroxyl function is provided by grafting are polyolefins. The monomers which are polymerized with monomers bearing a hydroxyl function or a function which may be converted into a hydroxyl function are advantageously olefins. The polymers bearing carboxylic acid or carboxylic acid anhydride functions are also advantageously polyolefins.

The term polyolefins is understood to refer to:
- homopolymers of ethylene or of propylene;
- copolymers of ethylene and of vinyl acetate;
- copolymers of ethylene and of at least one alkyl (meth)acrylate. The alkyl group of the alkyl (meth)acrylate has up to 10 carbon atoms and may be linear, branched or cyclic. By way of illustration of the alkyl (meth) acrylate, mention may be made in particular of n-butyl acrylate, methyl acrylate, isobutyl acrylate, 2-ethylhexyl acrylate, cyclohexyl acrylate, methyl methacrylate and ethyl methacrylate. Among these (meth)acrylates, ethyl acrylate, methyl acrylate, n-butyl acrylate and methyl methacrylate are preferred.
- copolymers of ethylene and of butene or of ethylene and of hexene.
- amorphous poly-alpha-olefins (APAOs).

Preferably, APAOs derived from ethylene, propylene, butene or hexene are used. Either ethylene propylene butene copolymers with a high butene content or ethylene propylene butene with a high propylene content or butene homo- or copolymers are advantageously used.

Ethylene/alkyl (meth)acrylate copolymers are advantageously used.

Thus, the binder containing a hydroxyl function may be, for example, an ethylene/(meth)acrylate/hydroxyethyl (meth)acrylate copolymer, an ethylene/vinyl acetate/hydroxyethyl (meth)acrylate copolymer or ethylene/alkyl or ethylene (meth)acrylate/vinyl acetate copolymers grafted with hydroxyethyl (meth)acrylate.

The hydroxyethyl polyacrylates or polymethacrylates are not always thermoplastic. It is thus advantageous to mix them with other polymers so that the resin has a thermoplastic nature. Since the resin is thermoplastic, it may readily be converted into a film in order, for example, to be coextruded.

It is also possible, even if the polymer having at least one hydroxyl function is thermoplastic, to mix it with other thermoplastic polymers.

As examples of polymers which may be mixed with the polymers having a hydroxyl function, mention may be made of:

polyethylene, polypropylene;

copolymers of ethylene with at least one product chosen from (i) salts and esters of unsaturated carboxylic acids, (ii) vinyl esters of saturated carboxylic acids, (iii) alpha-olefins, it being possible for the monomers (i) to (iii) to be grafted or copolymerized;

styrene/ethylene-butene/styrene (SEBS) block copolymers;

styrene/butadiene/styrene (SBS) block copolymers;

styrene/isoprene/styrene (SIS) block copolymers.

The composition of the mixtures, the comonomer content, the amount of hydroxyl functions and the structure of the polymers are optimized with regard to the desired adhesion and implementation properties.

It may be necessary to add compatibilizing agents to the resin in order to promote the homogeneity of the resin. These products are known per se; they are, for example, functionalized polyolefins such as copolymers of ethylene with at least one product chosen from (i) unsaturated carboxylic acids, salts thereof and esters thereof, (ii) unsaturated dicarboxylic acids, salts thereof, esters thereof, hemiesters thereof and anhydrides thereof, (iii) vinyl esters of saturated carboxylic acid, (iv) alpha-olefins, it being possible for the monomers (i) to (iv) to be grafted or copolymerized.

As examples of thermoplastic resins containing at least one hydroxyl function, mention may be made of:

mixtures of:

ethylene/vinyl alcohol (EVOH) copolymers or of poly(hydroxyethyl(meth)acrylate);

and of at least one product chosen from:

copolymers of ethylene with at least one product chosen from (i) unsaturated carboxylic acids, salts thereof and esters thereof, (ii) unsaturated dicarboxylic acids, salts thereof, esters thereof, hemiesters thereof and anhydrides thereof, (iii) vinyl esters of saturated carboxylic acid, it being possible for the monomers (i) to (iii) to be grafted or copolymerized;

polyethylenes, copolymers of ethylene and of alpha-olefins mixtures of:

polyethylene or of a copolymer of ethylene with unsaturated carboxylic acid esters or of copolymers of ethylene with vinyl esters of saturated carboxylic acids;

polyethylene or copolymers of ethylene and of alpha-olefins;

one or other or both of these polymers being separately or simultaneously grafted with hydroxyethyl (meth) acrylate;

partially or totally hydrolysed ethylene/vinyl acetate copolymers, it being possible for these copolymers also to contain alkyl (meth)acrylate.

The following resins are advantageously used:

mixtures of:

ethylene/alkyl (meth)acrylate copolymers;

EVOH ethylene/alkyl (meth)acrylate/maleic anhydride or glycidyl (meth)acrylate copolymers;

mixtures of:

ethylene/alkyl (meth)acrylate copolymers;

EVOH linear low density polyethylene grafted with maleic anhydride

EPR (ethylene-propylene) elastomer;

mixtures of:

ethylene/alkyl (meth)acrylate copolymers;

poly(hydroxyethyl (meth)acrylate);

mixtures of:

ethylene/alkyl (meth)acrylate copolymers;

ethylene/alpha-olefin copolymer;

one or other or both of these copolymers being separately or simultaneously grafted with hydroxyethyl (meth) acrylate.

ethylene/vinyl acetate/vinyl alcohol/alkyl (meth)acrylate copolymers.

By way of example, the thickness of this film of binder may be between 5 and 50 μm.

The polyolefins in the molten state may be grafted in the presence of radical initiator(s).

The grafting reaction is carried out in a single- or twin-screw extruder fed with polyolefins in a feed hopper, for example in the form of granules; in a first zone of the extruder, the polyolefins are melted by heating, and, in a second zone, the reactants are introduced into the molten mass of polyolefins.

The radical initiators may be chosen from peroxides, peracids, peresters and peracetals. They are generally used in a proportion of from 0.01% to 0.5% by mass relative to the polyolefins to be grafted.

By way of example, mention may be made of:

dicumyl peroxide (DICUP), 2,5-dimethyl-2,5-di-tert-butylperoxyhexane (DHBP),

α,α'(di-tert-butylperoxyisopropyl)benzene (Y1490).

It is preferred to dissolve the radical initiator in the product which is grafted while liquid before introducing it, for example using a metering pump, into the polyolefins in the molten state.

It is preferable for the zone for introduction of the reactants to be sufficiently long and to have a sufficiently low temperature that good dispersion of the reactants and a thermal decomposition of the radical initiator which is as low as possible are ensured.

The actual grafting reaction takes place in a third zone of the extruder at a temperature which is suitable to ensure the complete decomposition of the radical initiator; before the molten mass leaves the head of the extruder, a degassing zone is provided, in which the initiator decomposition products and the unreacted grafting product are degassed, for example under vacuum.

The grafted polyolefins are recovered at the extruder outlet, for example in the form of granulated rods after cooling in cold air.

The weight ratio of the grafts to the grafted polymer is generally between 0.1 and 5% and preferably 0.15 to 2.5%.

As regards the binder containing an epoxy function, this function may be introduced by grafting or copolymerization. As regards grafting, this may be carried out on any thermoplastic polymer, but advantageously on polyolefins. The polyolefins already mentioned above may be used to graft the hydroxyl function.

Ethylene/alkyl (meth)acrylate copolymers are advantageously used.

As examples of unsaturated epoxides, mention may be made in particular of glycidyl esters and ethers, glycidyl itaconate, vinyl glycidyl ether, allyl glycidyl ether and vinylcyclohexene monoxide.

Mention may also be made of alicyclic glycidyl esters and ethers such as 2-cyclohexene 1-glycidyl ether, cyclohexene-4,5-diglycidyl carboxylate, cyclohexene-4-glycidyl carboxylate, 5-norbornene-2-methyl-2-glycidyl carboxylate and endocisbicyclo(2.2.1)-5-heptene-2,3-diglycidyl dicarboxylate.

Among these unsaturated epoxides, glycidyl acrylate and methacrylate are most particularly preferred.

In order to graft the unsaturated epoxides to the polyolefins, it is possible to use the same process as that used to graft the monomers containing hydroxyl functions.

As regards the copolymers having copolymerized epoxy functions, these are copolymers of unsaturated epoxides and of any other monomer provided that it is copolymerizable with the unsaturated epoxide. Advantageously, the comonomers are olefins, alkyl (meth)acrylates and vinyl esters of saturated carboxylic acids.

Advantageously, the binder comprising copolymerized epoxy functions is a copolymer of ethylene and of at least one unsaturated epoxide.

For these copolymers of ethylene and of at least one unsaturated epoxide, the epoxide may be chosen from the same family as that already mentioned for the binders which are polyolefins grafted with unsaturated epoxides. This copolymer of ethylene and of at least one unsaturated epoxide may also comprise an alkyl (meth)acrylate or vinyl acetate. The alkyl (meth)acrylate may be chosen from the same family as that mentioned above for the optional comonomers of the polyolefins grafted with monomers containing a hydroxyl function. As examples of copolymers of ethylene and of at least one unsaturated epoxide, mention may be made of copolymers of ethylene, of an alkyl (meth) acrylate and of glycidyl methacrylate containing, on a weight basis, 2 to 10%, preferably 6 to 8% of glycidyl methacrylate and at least 50% of ethylene.

As regards the thermoplastic polymer comprising ethylene units and at least one alkyl (meth)acrylate unit, mention may be made of the ethylene/alkyl (meth)acrylate copolymers mentioned above in the general description of the polyolefins. Copolymers comprising, on a weight basis, 20 to 40% of (meth)acrylate and preferably 25 to 38% are advantageously used. Their melt index (MFI) may be between 1 and 500, for example.

These copolymers may be used as a mixture with polyethylene homopolymers, copolymers of ethylene and of at least one alpha-olefin, amorphous poly-alpha-olefins, copolymers of ethylene and of vinyl acetate, and SEBS, SBS or SIS block copolymers.

It would not constitute a departure from the scope of the invention to use mixtures of at least two of the binders of the present invention.

The polyketones are polymers comprising substantially one mole of carbon oxide for each mole of unsaturated monomer. This monomer may be chosen from alpha-olefins having from 2 to 12 carbon atoms or substitution derivatives thereof. It may also be chosen from styrene or derivatives thereof obtained by substitution with alkyls, such as methylstyrenes, ethylstyrene and isopropylstyrene.

Preferably, the polyketones are copolymers of ethylene and of carbon oxide or copolymers of ethylene, of polypropylene and of carbon oxide.

When the polyketones are copolymers of ethylene, of a second monomer and of carbon oxide, there are at least two ethylene units per unit of the second monomer and preferably 10 to 100.

The polyketones may be represented by the formula:

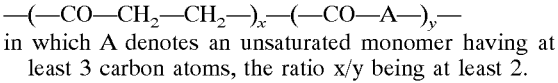

in which A denotes an unsaturated monomer having at least 3 carbon atoms, the ratio x/y being at least 2.

The units —(—CO—CH$_2$—CH$_2$—) and —(—CO—A—)— are distributed randomly in the polyketone chain.

The number-average molar masses may be between 1000 and 200,000, advantageously between 20,000 and 90,000 (measured by gel permeation chromatography). The melting points may be between 175 and 300° C., usually between 200 and 270° C.

Syntheses of these polyketones are described in U.S. Pat. Nos. 4,843,144, 4,880,903 and 3,694,412.

The layer of polyketone may be of any thickness.

The thermoplastic of the layer (F) may be a polyolefin, in particular those which have been defined above, a polyamide, a fluoro polymer or a polyester such as PET or PBT.

(F) may also be a rubber such as, for example, an EPDM (ethylene/propylene/diene), NBR (nitrile/butadiene) or HNBR (hydrogenated nitrile/butadiene).

The invention is particularly useful for the layers (F) made of polyethylene or of polypropylene (homo- or copolymers).

The layer of polyolefin is, for example, a layer of polyethylene, polypropylene or ethylene copolymers such as ethylene/propylene, ethylene/butene, ethylene/hexene, ethylene/octene or ethylene/propylene/butene or copolymers of ethylene with at least one product chosen from vinyl esters of saturated carboxylic acids, and esters and salts of unsaturated carboxylic acids. This layer may comprise, in addition to the polyolefin, another polymer, optionally a compatibilizing agent. It may also comprise a mixture of polyolefins.

The metal layer may be, for example, a foil or a film of a metal such as aluminium, iron, copper, tin or nickel, or an alloy containing at least two of these metals as main constituent. The thickness of the film or of the foil may be from about 0.01 to 0.2 mm. It is common practice to degrease the surface of the metal layer before laminating the binder of the invention on it.

The binders of the invention, the polyketone, the thermoplastics and the rubbers of the layer (F) may contain usual additives such as plasticizers, antioxidants and anti-UV agents.

The structures of the invention are manufactured according to the usual techniques of lamination, coextrusion, extrusion-lamination and layering.

The structures of the invention may also comprise other layers; for example, another layer of binder of the invention may be applied to the polyketone, followed by another layer (F), that is to say that they are structures (F)/binder of the invention/polyketone/binder of the invention/(F)

EXAMPLES

The products used are as follows:

EPCO: olefin/carbon monoxide alternating copolymer having a melting point equal to 204° C. and a melt index, measured at 240° C. under a 5 kg load, equal to 44 g/10 min.

Lotader 1: ethylene/ethyl acrylate/glycidyl methacrylate copolymer in a weight proportion of 66.9/25.5/7.6 and of MFI 6 (190° C.–2.16 kg).

Lotader 2: ethylene/ethyl acrylate/glycidyl methacrylate copolymer in a weight proportion of 71/27/2 and of MFI 6.

Lotader 3: ethylene/ethyl acrylate/maleic anhydride copolymer in a weight proportion of 91.5/5/3.5 and of MFI 5.

Lotryl 1: ethylene/methyl acrylate copolymer containing 29% by weight of acrylate and of MFI 3.

Lotryl 2: ethylene/butyl acrylate copolymer containing 35% by weight of acrylate and of MFI 40.

Lotryl 3: ethylene/butyl acrylate copolymer containing 35% by weight of acrylate and of MFI 320.

Orevac 1: maleic anhydride-grafted polypropylene comprising 1% MAH.

Orevac 2: maleic anhydride-grafted polyethylene with 0.4% MAH and of MFI 1.

Films of 50 μm of EPCO (polyketone) were prepared.

The various products were heat-sealed onto the above films in the following assemblies:

EPCO (50 μm)/binder (200 μm)/EPCO (50 μm)

The heat-sealing operations were carried out at 220° C. for 1 min with a hydraulic pressure of 350 bar.

The adhesion between the film of binder and the film of EPCO was measured by T peeling at a rate of 200 mm/min. The following peel strengths were obtained:

| PRODUCT | PEEL STRENGTH N/15 mm |
|---|---|
| Lotader 1 | Not delaminable |
| Lotader 2 | Not delaminable |
| Lotader 3 | 1 |
| Lotryl 1 | Not delaminable |
| Lotryl 1 grafted with 12% hydroxyethyl acrylate | Not delaminable |
| Lotryl 2 | 2 |
| Lotryl 2 grafted with 1.8% hydroxyethyl acrylate | 17 |
| Lotryl 3 | 5.2 |
| Lotryl 3 grafted with 3% hydroxyethyl acrylate | 7 |
| Orevac 1 | 0.1 |
| Orevac 2 | 1 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A multilayer structure comprising:
   (a) a layer of a binder selected from the group consisting of
      (i) thermoplastic polymers containing ethylene and at least one hydroxyl function,
      (ii) thermoplastic polymers containing ethylene and at least one epoxy function, and
      (iii) thermoplastic copolymers consisting of ethylene units and at least one alkyl (meth)acrylate unit; and
   (b) a layer of polyketone directly attached to one side of said binder layer.

2. The structure according to claim 1 wherein a layer selected from the group consisting of a thermoplastic polymer, a rubber and a metal is directly attached to a second side of said binder layer.

3. A multilayer structure comprising:
   (a) a layer of a binder selected from the group consisting of
      (i) thermoplastic polymers containing ethylene and at least one hydroxyl function,
      (ii) thermoplastic polymers containing ethylene and at least one epoxy function, and
      (iii) thermoplastic copolymers consisting essentially of ethylene units and at least one alkyl (meth)acrylate unit; and
   (b) a layer of polyketone directly attached to one side of said binder layer,
wherein said binder is a polyolefin grafted with an unsaturated monomer having at least one hydroxyl function.

4. A multilayer structure comprising:
   (a) a layer of a binder selected from the group consisting of
      (i) thermoplastic polymers containing ethylene and at least one hydroxyl function,
      (ii) thermoplastic posers containing ethylene and at least one epoxy function, and
      (iii) thermoplastic copolymers consisting essentially of ethylene units and at least one alkyl (meth)acrylate unit; and
   (b) a layer of polyketone directly attached to one side of said binder layer,
wherein said binder is an ethylene/alkyl (meth)acrylate copolymer grafted with hydroxyethyl (meth)acrylate.

5. A multilayer structure comprising:
   (a) a layer of a binder selected from the group consisting of
      (i) thermoplastic polymers containing ethylene and at least one hydroxyl function,
      (ii) thermoplastic polymers containing ethylene and at least one epoxy function, and
      (iii) thermoplastic copolymers consisting essentially of ethylene units and at least one alkyl (meth)acrylate unit; and
   (b) a layer of polyketone directly attached to one side of said binder layer,
wherein said binder is an ethylenelalkyl (meth)acrylate/glycidyl (meth)acrylate copolymer.

6. The structure according to claim 1 wherein the polyketone is a linear alternating copolymer of carbon oxide and of at least one unsaturated monomer selected from the group consisting of (i) alpha-olefins and substitution compounds thereof, and (ii) styrene and substitution compounds thereof obtained with alkyls.

7. The structure according to claim 2 wherein the layer directly attached to said second side of said binder layer is a polyethylene homo- or copolymer.

8. A multilayer structure consisting essentially of:
   (a) a layer of a binder selected from the group consisting of
      (i) thermoplastic pods containing ethylene and at least one hydroxyl function,
      (ii) thermoplastic polymers containing ethylene and at least one epoxy function, and
      (iii) thermoplastic copolymers consisting of ethylene units and at least one alkyl (meth)acrylate unit; and
   (b) a layer of polyketone directly attached to said binder layer.

9. A multilayer structure comprising:
   (a) a first layer of a binder selected from the group consisting of
      (i) thermoplastic polymers containing ethylene and at least one hydroxyl function, (ii) thermoplastic polymers containing ethylene and at least one epoxy function, and
(iii) thermoplastic copolymer consisting of ethylene units and at least one alkyl (meth)acrylate unit;

(b) a layer of polyketone having a first side thereof directly attached to a first side: of said fist binder layer;

(c) a layer selected from the group consisting of a thermoplastic polymer, a rubber and a metal is directly attached to a second side of said first binder layer;

(d) a second layer of a binder selected from the group consisting of
(i) thermoplastic polymer containing ethylene and at least one hydroxyl function,
(ii) thermoplastic polymers containing ethylene and at least one epoxy function, and
(iii) thermoplastic polymers consisting of ethylene units and at least one alkyl (meth)acrylate unit;
said second binder layer being attached to a second side of said polyketone layer; and (e) a second layer selected from the group consisting of a thermoplastic polymer, a rubber and a metal is directly attached to a second side of said second binder layer.

10. The multilayer structure according to claim 9 wherein the multilayer structure comprises a layer of packaging, bottles or pipes.

11. The multilayer structure according to claim 1 wherein said polyketone is a polymer comprising substantially one mole of carbon oxide for each mole of unsaturated monomer selected from the group consisting of alpha-olefins having 2 to 12 carbon atoms or substitution compounds thereof.

12. The multilayer structure according to claim 1 wherein said polyketone is (i) a copolymer of ethylene and of carbon oxide, or (ii) a copolymer of ethylene, of polypropylene and of carbon oxide.

13. The multilayer structure according to claim 1 wherein said polyketone is a copolymer of ethylene, of a second monomer and of carbon oxide, and wherein there are at least two ethylene units per unit of the second monomer.

14. The multilayer structure according to claim 13 wherein there are 10 to 100 ethylene units per unit of the second monomer.

15. A multilayer structure comprising:
(a) a layer of a binder selected from the group consisting of
(i) thermoplastic polymers containing ethylene and at least one hydroxyl, function, and
(ii) thermoplastic polymers containing ethylene and at least one epoxy function; and
(b) a layer of polyketone directly attached to one side of said binder layer.

16. The structure according to claim 15, wherein a layer selected from the group consisting of a thermoplastic polymer, a rubber and a metal is directly attached to a second side of said binder layer.

17. The structure according to claim 15 wherein said binder is a polyolefin grafted with an unsaturated monomer having at least one hydroxyl function.

18. The structure according to claim 15 wherein said binder is an ethylene/alkyl (meth)acrylate copolymer grafted with hydroxyethyl (meth)acrylate.

19. The structure according to claim 15 wherein the polyketone is a linear alternating copolymer of carbon oxide and of at least one unsaturated monomer selected from the group consisting of
(i) alpha-olefin and substitution compounds thereof, and
(ii) styrene and substitution compounds thereof obtained with alkyls.

20. The structure according to claim 16 wherein the layer directly attached to said second side of said binder layer is a polyethylene homo- or copolymer.

21. The multilayer structure according to claim 15 wherein said polyketone is a polymer comprising substantially one mole of carbon oxide for each mole of unsaturated monomer selected from the group consisting of alpha-olefin having 2 to 12 carbon atoms or substitution compounds thereof.

22. The multilayer structure according to claim 15 wherein said polyketone is (i) a copolymer of ethylene and of carbon oxide, or (ii) a copolymer of ethylene, of polypropylene and of carbon oxide.

23. The multilayer structure according to claim 15 wherein said polyketone is a copolymer of ethylene, of a second monomer and of carbon oxide, and wherein there are at least two ethylene units per unit of the second monomer.

24. The multilayer structure according to claim 23 wherein there are 10 to 100 ethylene units per unit of the second monomer.

25. A multilayer structure comprising:
(a) a first layer of a binder selected from the group consisting of
(i) thermoplastic polymers containing ethylene and at least one hydroxyl function, and
(ii) thermoplastic polymers containing ethylene and at least one epoxy function;

(b) a layer of polyketone having a first side thereof directly attached to a first side of said first binder layer;

(c) a layer selected from the group consisting of a thermoplastic polymer, a rubber and a metal is directly attached to a second side of said first binder layer;

(d) a second layer of a binder selected from the group consisting of
(i) thermoplastic polymers containing ethylene and at least one hydroxyl function, and
(ii) thermoplastic polymers containing ethylene and at least one epoxy function;
said second binder layer being attached to a second side of said polyketcine layer; and (e) a second layer selected from the group consisting of a thermoplastic polymer, a rubber and a metal is directly attached to a second side of said second binder layer.

26. The multilayer structure according to claim 25 wherein the multilayer structure comprises a layer of packaging, bottles or pipes.

27. The multilayer structure according to claim 10 wherein the multilayer structure comprising a layer of packaging, bottles or pipes is manufactured by coextrusion, lamination or coextrusion blow-moulding.

28. The multilayer structure according to claim 26 wherein the multilayer structure comprising a layer of packaging, bottles or pipes is manufactured by coextrusion, lamination or coextrusion blow-moulding.

* * * * *